United States Patent
Ong et al.

(10) Patent No.: US 6,300,701 B1
(45) Date of Patent: Oct. 9, 2001

(54) ROGOWSKI COIL METHOD OF DETERMINATION OF BEARING LUBRICATION IN DYNAMOELECTRIC MACHINES

(75) Inventors: Raymond K. J. Ong; James Victor Kay; James H Dymond, all of Peterborough; Raymond David Findlay, Ancaster, all of (CA)

(73) Assignee: General Electric Canada Inc., Mississauga (CA)

( * ) Notice: Subject to any disclaimer, the term of this patent is extended or adjusted under 35 U.S.C. 154(b) by 0 days.

(21) Appl. No.: 09/255,867

(22) Filed: Feb. 23, 1999

(51) Int. Cl.[7] ...................................................... H02K 1/00
(52) U.S. Cl. .............................. 310/179; 310/90; 310/66; 310/69; 310/68 R; 384/448; 340/682
(58) Field of Search ................................ 310/179, 90, 69, 310/68 D, 68 C, 68 R, 66; 384/448, 624, 625; 340/682, 648

(56) References Cited

U.S. PATENT DOCUMENTS

| | | | |
|---|---|---|---|
| 3,842,297 | * 10/1974 | Pleiss et al. | 310/68 R |
| 4,379,291 | * 4/1983 | Hubbard et al. | 340/682 |
| 4,831,295 | * 5/1989 | Posedel | 310/72 |
| 5,381,090 | * 1/1995 | Adler et al. | 324/174 |
| 5,602,437 | * 2/1997 | Shahamat et al. | 310/90 |
| 5,796,349 | * 8/1998 | Klein | 340/682 |

OTHER PUBLICATIONS

A Comparison of Techniques for Measurement of Shaft Currents in Rotating Machines 1997 IEEE PE–557–EC–0–01–1997 Ong et al.

Shaft Current Pheuomeuon. Experimental Testing and Analysis of a Large Induction Motor. Proc. of Iasted International Conference High Technology in the Power Industry Orlando Fl. Oct. 27–30, 1997 Org et al.

Performance of Oil Rings R Baudry et al Mechanical Engineering Feb. 1937.

Bearing Oil–Ring Performance—Lemmon et al Journal of Basic Engineering Jun. 1960.

An Analysis of the Effect of Lubricant Supply Rate on the Performance of the 360° Journal Bearing. H J Connors ASIF Transactions 5 404–417 (1962).

Shaft Current in Electric Machines Alger et al Transactions AIGE—Feb. 4–8, 1924.

* cited by examiner

*Primary Examiner*—Elvin Enad
*Assistant Examiner*—Thanh Lam

(57) ABSTRACT

It is possible to monitor the performance of a lubrication system performance of a Dynamoelectric Machine (DEM) by observing the electric current flowing in the DEM shaft. Suitable Rogowski coils are mounted around the shaft of the rotor of a DEM just inboard the bearings. The Rogowski coil may be mounted on the shaft to rotate with the shaft, or it may be mounted on said DEM so as to surround the shaft and remain stationary. Shaft current magnitudes may be established for start-up and steady state operating conditions.

Any deviation from the steady state shaft current magnitude may be taken as a warning that the DEM bearing lubrication system is malfunctioning.

7 Claims, 4 Drawing Sheets

ROGOWSKI COIL METHOD OF DETERMINATION OF BEARING LUBRICATION IN DYNAMOELECTRIC MACHINES

FIELD OF INVENTION

This invention is useful in determining the performance of hydrodynamically lubricated self contained bearings in a dynamoelectric machine (DEM) during operation of the machine. The invention is applicable to the evaluation of the thickness of an oil film and the condition of the oil forming the film, which film is developed by the pumping action of a rotating oil ring mounted on the rotating shaft of a self contained bearing in a DEM.

BACKGROUND OF THE INVENTION

The evaluation of the performance of self contained hydrodynamically lubricated bearings in DEM's has hitherto been a difficult task to perform. Oil rings mounted on a shaft in a bearing assembly are not readily accessible during operation of the DEM for close examination to determine how effectively the lubricating oil is being transferred to the bearing from the oil reservoir located in the bearing housing.

Because the rotation of the oil ring is reliant on frictional engagement between the shaft and oil ring mating surfaces, it is apparent that any disturbance which alters the coefficient of friction between the oil ring and the shaft will lead to increase slippage of the oil ring on the shaft with a resultant consequent decrease in the volume of lubricating oil delivered to the bearing.

It will be readily apparent that as the shaft speeds of DEM's are increased, the oil ring speed must increase with increasing shaft speed to the point where the oil film between the oil ring and the shaft causes the oil ring to begin to slip on the shaft because the drag force on the immersed portion of the oil ring constantly increases as the oil ring moves through the oil reservoir of the bearing. The shearing forces acting on the oil ring continue to increase while the driving force causing the ring to rotate remains relatively constant. At some point the driving force, tending to turn the oil ring, is largely dissipated in overcoming the shear forces of the oil ring moving through the oil in the bearing reservoir and the ring begins to slip.

Attempts to evaluate the effectiveness of this method of lubricating the bearings of DEM's have usually resorted to the visual observation of the rotation of an oil ring which has been suitably marked to enable the observer to count the rotations of the oil ring during operation of the DEM. The correlation between oil ring rotation and the amount of oil delivered to the bearing in a relationship which is relatively easy to establish by those skilled in the tribological art.

SUMMARY OF THE INVENTION

This invention seeks to overcome the deficiencies of the above prior art methods of evaluation of the oil ring performance by measuring the shaft currents existing in the shaft of a DEM. Shaft currents are a natural occurrence in most DEM's and this invention makes use of the occurrence of shaft currents to monitor the lubrication performance of the oil ring lubrication system.

In a first embodiment of this invention, a pair of Rogowski coils are tightly wound around the DEM shaft at the remote ends of the DEM rotor shaft just inside the location of the shaft bearing. The coil ends are fed to a monitoring station through the shaft. The coils are calibrated and the DEM is started. The monitoring apparatus must preferably be capable of measuring the complete spectrum of voltages induced in the Rogowski coils by the shaft flux in order to obtain meaningful data. The shaft currents must pass through the shaft, the oil film on the bearing surfaces, the bearing structure and the machine frame. In the pathway defined above, the only component which is subject to significant change during operation of the DEM is the oil film present in the bearing. The value of the shaft current may be calculated from the signal produced by the Rogowski coils and a steady state value of shaft current may be established when the shaft speed is slow enough to assure that the oil ring is delivering the required design amount of oil to the bearing. At start up of the DEM when an oil film is not present in the shaft bearing interface, the shaft current will usually be at its maximum value. As the speed of the rotor shaft is increased, the shaft current will drop significantly as an oil film is formed in the shaft bearing interface. This condition will continue to exist within the "design" range for the bearing. If the shaft speed is increased beyond the design range, the oil ring will begin to slip on the rotor shaft at some point. At this time, the bearing oil film will be diminished and the resistance to the flow of shaft current through the bearings will drop significantly due to the decrease in oil film thickness. Consequently, the current circulating through the rotor shaft win dramatically increase at this time (as evidenced by the Rogowski coil output) indicating a potential bearing failure is imminent.

The Rogowski apparatus of this invention may be used to study the performance of the lubrication system of the bearings of a DEM whether the oil is pumped into the shaft-bearing interface by an oil ring, or some other kind of oil pump, the above apparatus will provide a meaningful indication of the presence of a bearing oil film in the DEM.

A second embodiment of this invention will disclose the operation of a Rogowski coil apparatus wherein at least one stationary Rogowski coil is mounted on the DEM (preferably on a bearing housing) so as to be concentric with and closely envelop the rotating shaft of the DEM and supply an output signal to monitoring equipment which is indicative of the current flowing in the rotor shaft.

DESCRIPTION OF THE PREFERRED EMBODIMENT

Figure 1:
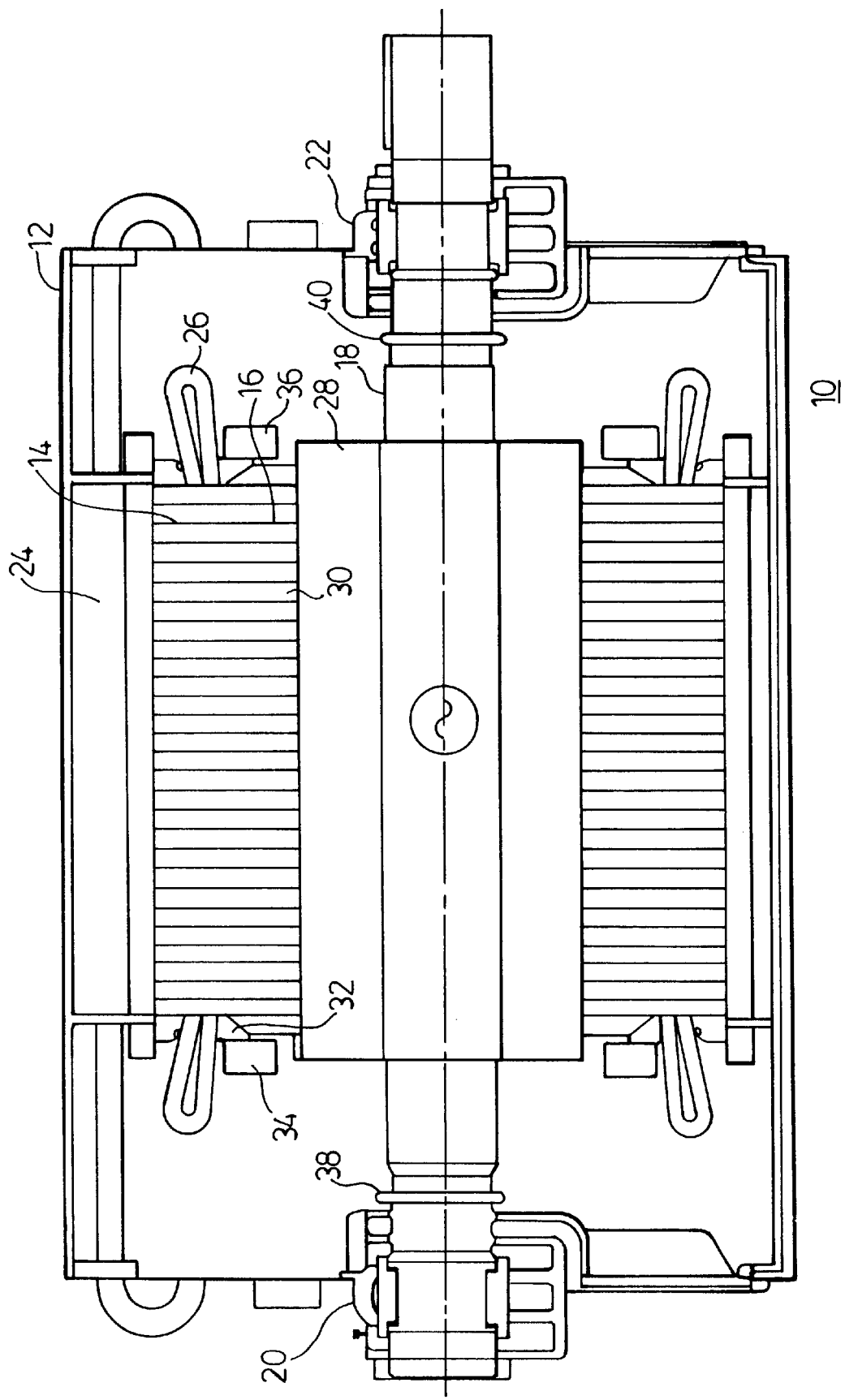
FIG. 1 is an illustration of a dynamoelectric induction machine.

Referring to the DEM of FIG. 1, it will be seen that a housing 12 is provided with a stator 14 and a rotor 16 mounted therein. The rotor 16 is mounted on a shaft 18 which is journalled in suitable bearings 20 and 22.

In this illustration, the stator 14 is composed of suitable packets of magnetic laminations 24 through which stator windings such as 26 pass through slots (not shown) in the stator lamination packets 24.

The rotor 16 is provided with a spider 28 on which the rotor lamination packets 30 are mounted. The rotor packets are provided with rotor winding slots (not shown) in which rotor windings 32 are mounted. The rotor windings are traditionally copper or aluminum bars (uninsulated) which are connected to shorting rings 34 and 36 at each end of the rotor.

The rotor shaft is provided with a pair of Rogowski coils 38 and 40 wound tightly on shaft 18 just in board of bearings 20 and 22.

Figure 2:
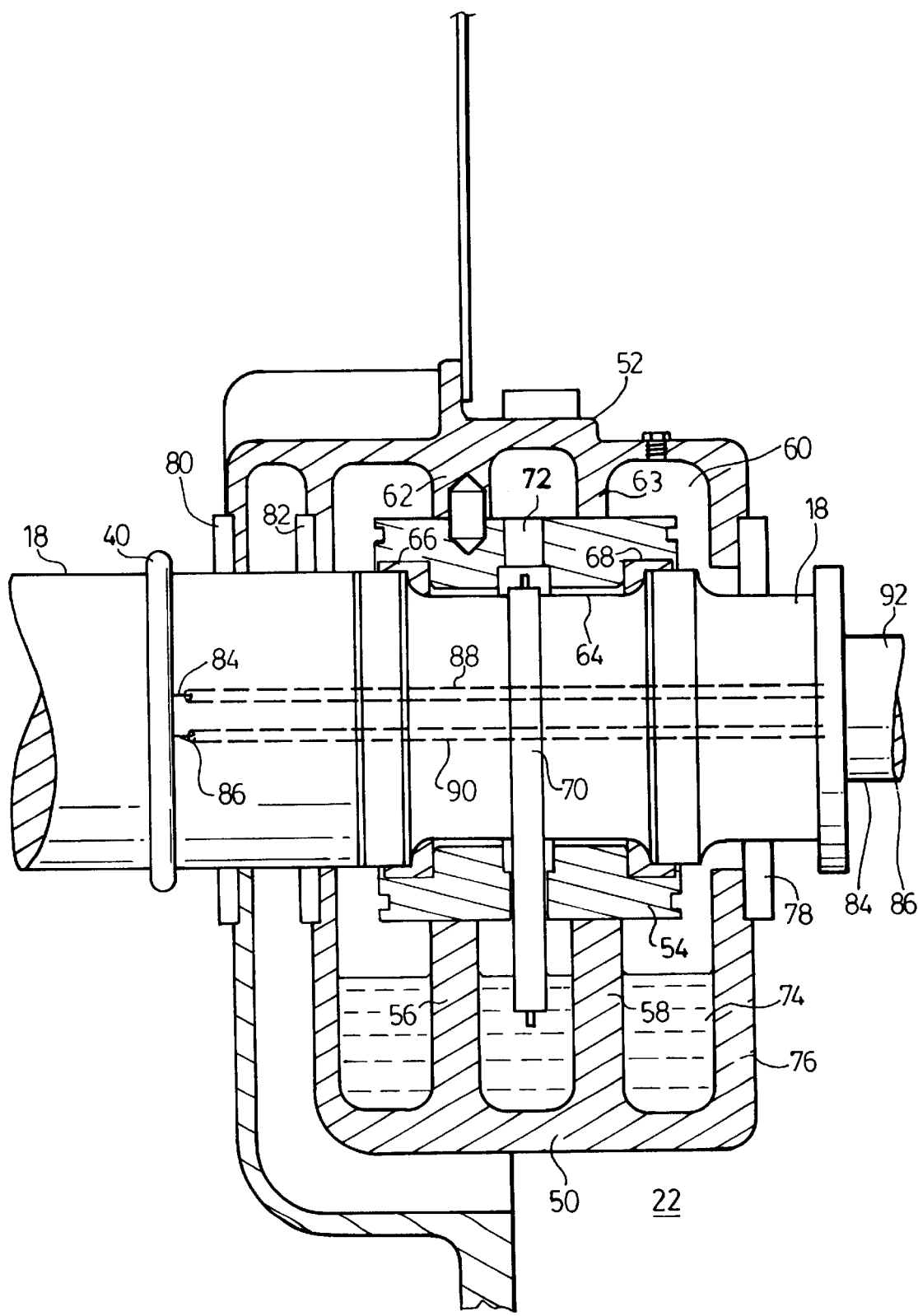
FIG. 2 is a sectional view of a bearing for the machine of FIG. 1.

FIG. 2 shows an enlarged view of the bearing 22 having Rogowski coil 40 mounted on shaft 18. Bearing 22 comprises a lower support portion 50 and an upper cap 52. The bearing support 50 is solidly mounted into the frame (not shown) of the DEM to provide the vertical force necessary to carry the rotor 16 and supply the required horizontal stabilizing forces necessary to maintain the rotor 16 in alignment with stator 14.

Bearing 22 is supplied with a lower bearing shoe 54 which encircles the lower half of shaft 18. Shoe 54 is supported on webs 56 and 58 which encircle the half shoe 54.

A bearing cap 60 encircles the top half of shaft 18 and is supported by webs 62 and 63 of bearing cap 52. Bearing shoes 54 and 60 are mated to each other so as to form complimentary bearing components. A pair of complimentary thrust bearings 66 and 68 which are incorporated into the bearing shoes 54 and 60 to keep shaft 18 located in the desired horizontal location.

Because shaft 18 has a depressed section of smaller diameter at 64, the two rings 66 and 68 which are held firmly in place by shoes 54 and 60, are able to provide the required stabilization of the shaft to withstand severe side thrust forces on the shaft 18.

In this illustration, a bearing oil ring 70 is located in the center of shoes 54 and 60 of bearing 22 and the ring 70 is located in recess 72 of upper shoe 60. Ring 70 rests on shaft 18 and is free to rotate in recess 72. Bearing oil 74 is contained in the reservoir 76 formed in the lower portion 50 of bearing 22.

Bearing 22 has a plate 78 to seal one side of the bearing 22. On the drive end of shaft 18, a pair of sealing rings 80, 82 provide the necessary barrier to keep oil in the bearing, whilst keeping foreign material out of the interior of the bearing 22.

Mounted on shaft 18 adjacent bearing 22 is Rogowski Coil 40. The coil is wound on shaft 18 so as to be frictionally secured to the surface of shaft 18. Plastic clamping devices may be used to secure the coil 84 in place if needed.

A pair of insulated leads 84 and 86 are connected to the two ends of coil 40 and are fed through a pair of passageways 88 and 90 in shaft 18 to slip ring device 92 mounted on the end of shaft 18. The leads 84 and 86 emanating from slip ring device 92 are taken to suitable monitoring equipment (not shown).

In operation, rotor 16 is rotated by the field produced in stator 14. At the same time, as the flux from stator 14 produces a rotating field to rotate, a homopolar flux is produced in the DEM which attempts to establish a flow of shaft current in the DEM.

In most DEM's, the shaft current is relatively small but does exist. Shaft current flows through a circuit comprising the shaft, bearings, (and bearing pedestals if present) through the DEM frame or ground return.

Figure 3:
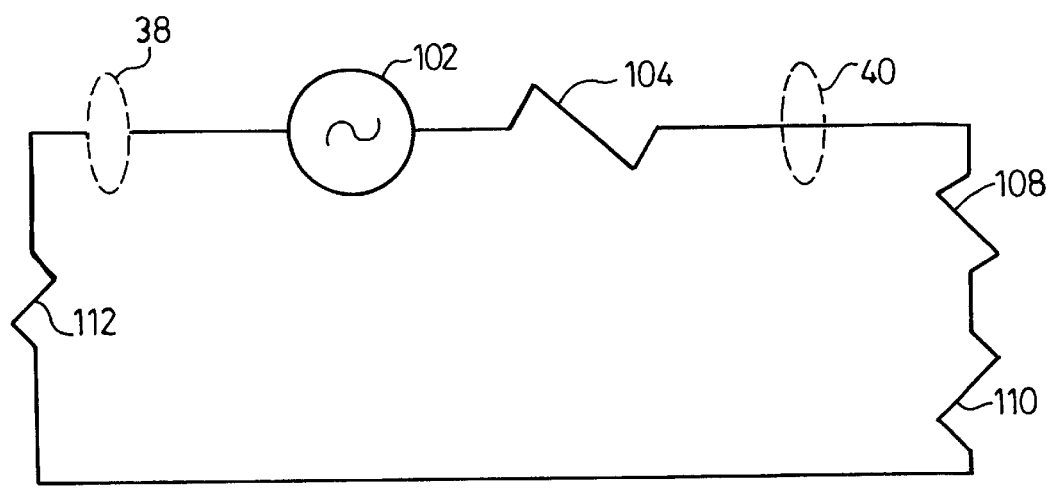
FIG. 3 is a circuit which is representative of the resistive elements through which motor shaft current flows.

FIG. 3 shows the electrical equivalent circuit 100 in which the shaft circulating current of the DEM such as shown in FIG. 1 flows. The circuit comprises generator 102, a shaft resistance 104, Rogowski coil 40, a resistance 108 representing the oil film in the bearing such as 22; and a resistance 1 10 representing insulation which may be present between the bearing 22 and the machine frame, or ground. Resistance 112 represents the oil film resistance of bearing 20; and element 38 represents the second shaft mounted Rogowski coil.

As soon as the stator is energized, the flux causing the shaft current to flow is produced by the stator. Shaft current begins to flow through the shaft and bearings according to the circuit shown in FIG. 3. At the time of start up, the shaft rotation has not been sufficient to produce any flow of lubricant to the bearings 20 and 22. At this time, the oil film resistance of bearings 20 and 22 is a minimum and the magnitude of the circulating current in shaft 18 is a maximum. This magnitude of shaft current will be evident from the Rogowski coil outputs.

As the shaft speed increases and oil rings such as 70 begin to transfer oil from the reservoir 74 to shaft 18, an oil film builds up in bearings 20 and 22, the Rogowski coils will signal a decreasing shaft current in the machine. The shaft current decreases to a steady state value when the oil film stabilizes in bearings 20 and 22.

The Rogowski coils produce outputs which may be used to monitor bearing performance, and oil ring performance within the bearing. The Rogowski coil outputs may be sampled to produce a characteristic chart of shaft current versus oil film present in the bearings.

Any operating deficiency which decreases the flow of lubricating oil to bearings of a DEM will be evident from the output of the Rogowski Coils.

This system may be used to measure the shaft current in a DEM at standstill, before rotation of the shaft has begun, and at various shaft speeds as the shaft is accelerated. It is well known by those skilled in the art that the oil ring will begin to slip on the shaft when a critical shaft speed has been reached. This method of measurement will allow a skilled operator to measure the point at which slippage of the oil ring on the motor shaft begins.

Figure 4:
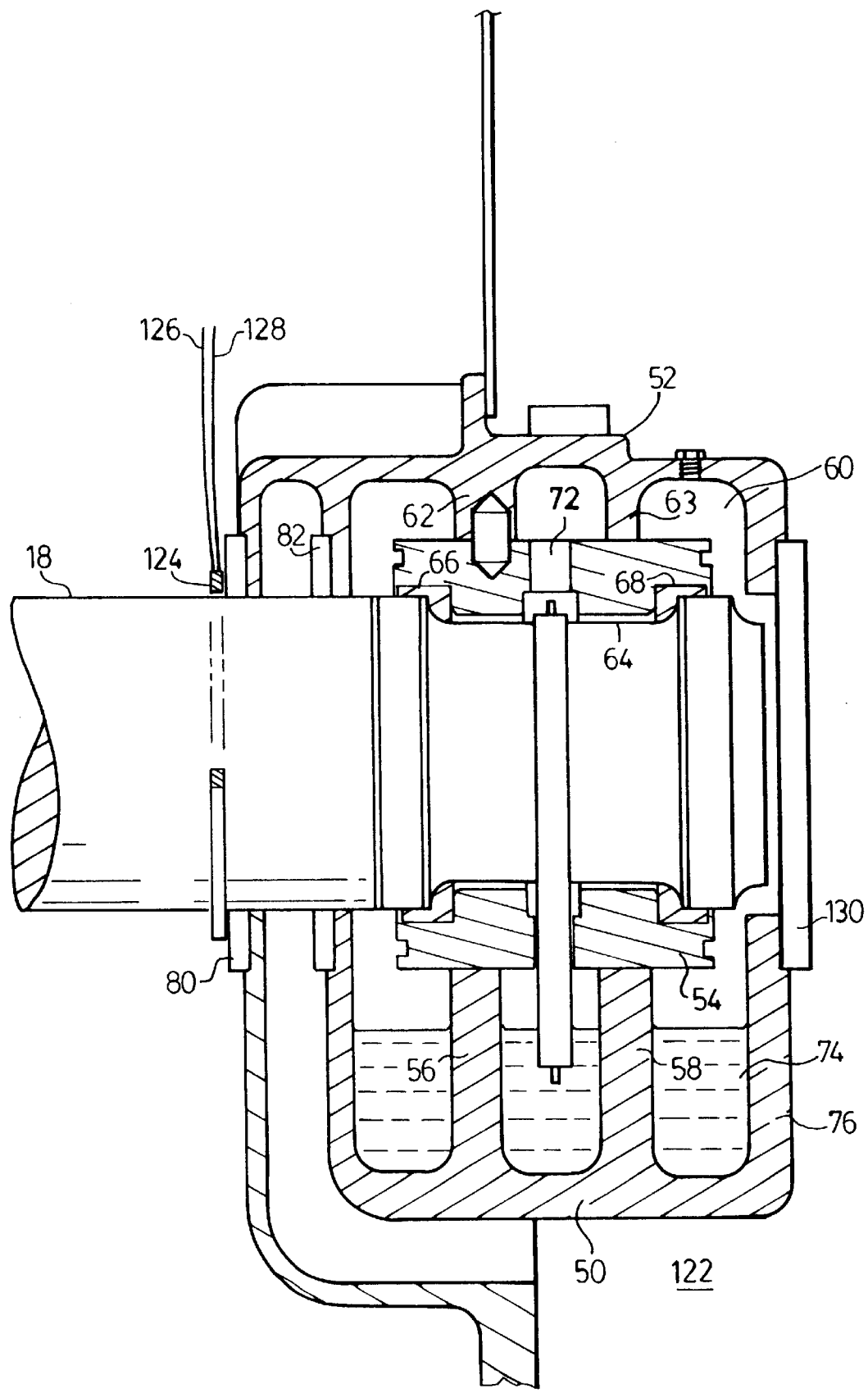
FIG. 4 is a sectional view of a bearing of a DEM on which a stationary Rogowski coil is mounted.

FIG. 4 shows a bearing 122 slightly modified from the bearing 22 shown in FIG. 2 but where the elements common to both figures bear the same reference numerals.

Bearing 122 journals shaft 18 therein and oil ring 70 provides the necessary lubricant to the shaft-bearing interface as described heretofore.

A Rogowski coil 124 is mounted on seal 80 so that coil 124 is concentric with the shaft 18 but is spaced a predetermined distance say 0.05–0.5 inches, this distance is not critical; there must be sufficient clearance to permit shaft 18 to rotate without contact with coil 124. Coil 124 is an air core induction device and the coupling with shaft 18 is not critical until the clearance distance from the shaft 18 becomes excessively large.

The Rogowski coil 124 may be mounted on bearing 122 in any convenient manner, in this instance, the body of seal 80 has been chosen for convenience of installation and easy access to the leads 126 and 128.

The Rogowski coil installation of FIG. 4 requires no ducted or hollow shaft to achieve the shaft current signals from the coil surrounding the shaft, thus in certain instances may offer advantages for installation on DEM's already installed in which it is desired to determine the magnitude of shaft current flowing in the machine. It is especially adaptable to installations where it is desired to measure the impedance of a lubrication system in a vertical shaft machine such as a waterwheel generator.

It will be obvious to those skilled in the art that the condition of the oil in the bearings may be evaluated over a period of time by periodic sampling of the Rogowski coil output; contamination of bearing oil tends to render the oil more conductive for passage of the shaft current.

Other variations will be apparent to those skilled in the art after reading this specification, however, the ambit of applicant's invention is limited in scope only by the following claims.

What is claimed is:

1. A method of monitoring the performance of a lubrication system of a dynamoelectric induction machine (DEM) comprising;

providing a DEM having a housing containing stator, and a rotor mounted on a shaft within said stator, providing a pair of bearing members in said housing for receiving said rotor shaft therein, providing lubrication means to said bearings to provide lubrication for said bearings and said shaft, providing at least one Rogowski coil on or near said rotor shaft at a location inboard of and adjacent to one of said bearings for monitoring the current induced in said shaft and for producing an output signal in accordance with the current flowing in said shaft when said DEM is energized, receiving a signal generated in said Rogowski coil in suitable monitoring equipment to provide an indication of the shaft current as sensed by said Rogowski coil, calibrating said Rogowski coil output for the determination of the current flowing in said shaft, producing a characteristic chart of shaft current vs. oil film present in the bearings of the DEM, determining the lubrication performance of said lubrication means from said chart.

2. A method as claimed in claim 1 wherein said Rogowski coil is mounted on said shaft.

3. A method as claimed in claim 1 wherein said Rogowski coil is mounted in a stationary manner on said DEM so as to surround said shaft and be concentric therewith.

4. A method as claimed in claim 1 wherein said lubrication means comprises an oil ring riding on said shaft in said bearing.

5. A method as claimed in claim 1 wherein said lubrication means comprises an oil pump for pumping oil into said bearings.

6. A monitoring system for determining the performance of a lubrication system for a dynamoelectric induction machine (DEM) wherein;

said DEM comprises a housing containing a stator and a rotor wherein said rotor is mounted on shaft for rotation within said stator in a pair of bearings mounted in said housing, said DEM having at least one Rogowski coil mounted in a working relationship with said shaft adjacent to and inboard one of said bearings, said Rogowski coil having a pair of insulated output leads connected thereto, and monitoring means connected to said output leads to determine the performance of the lubrication system from the flow of shaft current in said DEM.

7. A monitoring system as claimed in claim 6 wherein said shaft is provided with at least one channel therein permitting said insulated leads to be fed from said coil to a point on said shaft remote from said bearing, connecting said leads to a slip ring device, to produce a pair of stationary terminals connected to said leads, monitoring the signal produced at said stationary terminals.

* * * * *